United States Patent [19]
Lever et al.

[11] Patent Number: 6,085,624
[45] Date of Patent: Jul. 11, 2000

[54] EDGE INSPECTION SYSTEM

[75] Inventors: Thomas W. Lever, Glasgow; Frederico de Magalhaes, Bedford, both of United Kingdom

[73] Assignee: Asko, Inc., Homestead, Pa.

[21] Appl. No.: 08/776,229

[22] PCT Filed: Jul. 24, 1995

[86] PCT No.: PCT/GB95/01748

§ 371 Date: Dec. 3, 1997

§ 102(e) Date: Dec. 3, 1997

[87] PCT Pub. No.: WO96/03245

PCT Pub. Date: Feb. 8, 1996

[30] Foreign Application Priority Data

Jul. 22, 1994 [GB] United Kingdom .................. 9414803

[51] Int. Cl.[7] .................................................. B23D 19/06
[52] U.S. Cl. ...................................... 83/13; 83/73; 83/75
[58] Field of Search .................................. 83/13, 73, 34, 83/75, 75.5, 76.6, 76.8, 365, 368, 370, 371, 649, 108; 225/2

[56] References Cited

U.S. PATENT DOCUMENTS

| | | |
|---|---|---|
| 2,346,194 | 4/1944 | Sjostrom .................................... 83/365 |
| 3,169,432 | 2/1965 | Hoffman et al. .......................... 83/365 |
| 3,203,293 | 8/1965 | Lee ............................................. 83/365 |
| 3,286,567 | 11/1966 | Wright ...................................... 83/365 |
| 3,292,469 | 12/1966 | Vaccaro .................................... 83/365 |
| 3,312,135 | 4/1967 | Mraz ......................................... 83/675 |
| 3,730,043 | 5/1973 | Zimmermann ............................ 83/502 |
| 4,307,637 | 12/1981 | Vanderhulst .............................. 83/500 |
| 4,404,634 | 9/1983 | Bautz ........................................ 83/365 |
| 4,475,422 | 10/1984 | Lawson .................................... 83/76.3 |
| 4,667,550 | 5/1987 | Eiting ......................................... 83/56 |
| 5,267,168 | 11/1993 | Antonissen et al. ..................... 83/75.5 |

OTHER PUBLICATIONS

"Improved Coil Slitting Cutter," Sheet Metal Industries, Vol. 50, No. 03, pp. 165–166, Mar. 1973.

*Primary Examiner*—M. Rachuba
*Assistant Examiner*—Gyounghyun Bae
*Attorney, Agent, or Firm*—Reed Smith Shaw & McClay LLP

[57] ABSTRACT

A system for inspecting at least one edge of metal strip after the at least one edge has been trimmed by at least one cutting device. Included is an inspection station that has at least one image producer for forming at least one image of the at least one edge passing the inspection station. The at least one image is analyzed to determine at least one quality characteristic of the at least one trimmed edge.

23 Claims, 4 Drawing Sheets

EDGE INSPECTION SYSTEM

BACKGROUND OF THE INVENTION

This invention relates to an apparatus and method for inspecting the edges of metal strip during production. The invention is particularly but not exclusively applicable to the production of hot rolled steel strip.

Steel strip is commonly produced by hot rolling to provide strip typically 1.5 mm to 5.5 mm thick. This strip must then be cleaned and have its edges trimmed before undergoing further processing such as cold rolling and/or coating. The edge trimming is conventionally performed by rotary cutting blades mounted above and below the strip path at either side of the desired width, the blades being rotated by pull-through of the strip.

It is important to obtain a good quality of trimmed edge if the subsequent processing is to be satisfactory. For example, a poor edge may produce small flakes of steel which become trapped between the strip and the rolls of cold rolling mills, damaging both the strip and the rolls. Poor quality edges also cannot be coated satisfactorily in processes such as powder coating.

The nature of the cut edge is determined by the setting of the rotary cutting blades. The upper blade can be adjusted vertically to give a desired degree of radial overlap with the lower blade, while the lower blade can be adjusted in and out to adjust the horizontal gap with the top blade.

It has hitherto been the practice to mount the cutting blade shafts in such a manner that these adjustments must be carried out by the manual adjustment of bolts and the like and the use of spacers and shims. Further, it has been customary to adjust the cutting blades to settings which are thought to be correct, from empirical experience with strip of the same thickness and metallurgical composition, and thereafter to edge trim whole coils of strip. Inspection has been limited to visual inspection of finished coils with the aid only of a hand lens; this can lead to a number of coils having to be scrapped or reworked if the edge quality has become unacceptable, followed by time consuming hand adjustment of the cutting blades on an empirical basis.

A principal object of the present invention is to improve on such prior art processes and apparatus.

SUMMARY OF THE INVENTION

The present invention provides a method of inspecting an edge of strip metal after the edge is trimmed by passing it between upper and lower rotary blades which remove an edge strip by partial slitting and partial shearing; the method comprising passing the trimmed strip along a predetermined path past an inspection station, forming a video image of the trimmed edge as it passes the inspection station, detecting from said image the ratio of slit to shear in the edge, and utilizing said ratio to control the trimming process.

Preferably, both edges of the strip are inspected simultaneously.

The method may further include detecting from said image(s) a measure of the straightness of the division between the cut and sheared zones, and utilizing said straightness measure(s) in controlling the trimming process.

The parameter(s) derived from the video image(s) may be used to control the trimming process by providing information to an operator in the event that the parameter or one of the parameters moves out of a predetermined range of values. Alternatively, the parameter(s) derived from the video image(s) may be used to control the trimming process by providing a feedback signal which controls the positioning of the rotary blades.

When used for the production of steel strip, the slit:shear ratio is typically maintained in the range ±10% for mild steel strip.

From another aspect, the invention provides apparatus for use in inspecting an edge of strip metal after the edge is trimmed by passing it between upper and lower rotary blades which remove an edge strip by partial slitting and partial shearing; the apparatus comprising an inspection station through which the strip is passed after trimming, the inspection station comprising video imaging means arranged to provide a video signal of the trimmed edge, and image processing means connected to receive said video signal and operating to derive therefrom the ratio of slit to shear in the edge.

Preferably, the inspection station comprises two video imaging means, one for each edge of the strip.

The image processing means may also operate to derive from the video signal(s) a measure of the straightness of the division between the slit and sheared regions of the trimmed edge(s).

The apparatus preferably includes operator display means driven by the image processing means to display information related to the parameter(s) derived from the video signals(s). The image processing means may also provide a feedback signal for use in controlling the edge trimming apparatus.

BRIEF DESCRIPTION OF THE DRAWINGS

An embodiment of the invention will now be described, by way of example only, with reference to the accompanying drawings, in which.

DETAILED DESCRIPTION OF THE PRESENTLY PREFERRED EMBODIMENT

Figure 1:
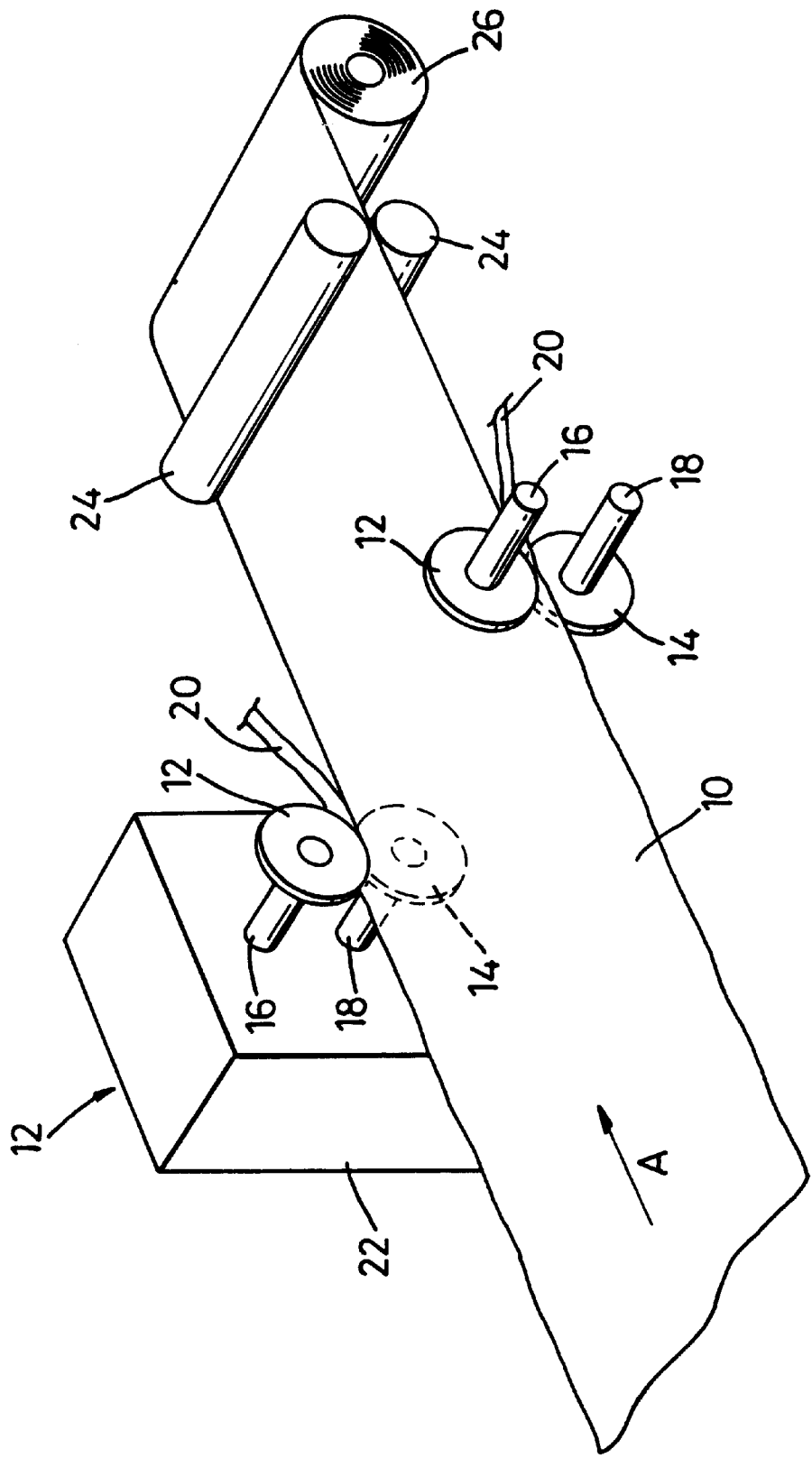
FIG. 1 is a schematic perspective view of an edge trimming process.

Referring to FIG. 1, steel strip 10 which has previously been hot rolled and coiled is uncoiled and fed in the direction of the arrow A through an edge trimming station 12. The function of the edge trimming station 12 is to trim the strip 10 to a precise width with straight edges, the as-rolled strip having non-uniform, wavy edges as shown in FIG. 1 in exaggerated fashion.

The edge trimming station 12 comprises upper and lower rotary blades 12 and 14 on either side of the strip, each blade 12, 14 being mounted on a rotary shaft 16, 18 mounted in a left or right housing, one of which is shown at 22.

Blades suitable for this use are well known in the art and may, for example, be obtained from Asko, Inc. of Homestead, Pa.

The edge trimmings 20 are removed from the strip path by gravity or by suitable guides and diverted to scrap containers (not shown).

The blades 12 and 14 are freely rotatable. The strip 10 is pulled through the trimming station, as by traction rolls 24, and this movement of the strip 10 produces rotation of the blades 14 and 16. Typically, the trimmed strip will then be reeled as at 26 for transport and further processing.

Figure 2:
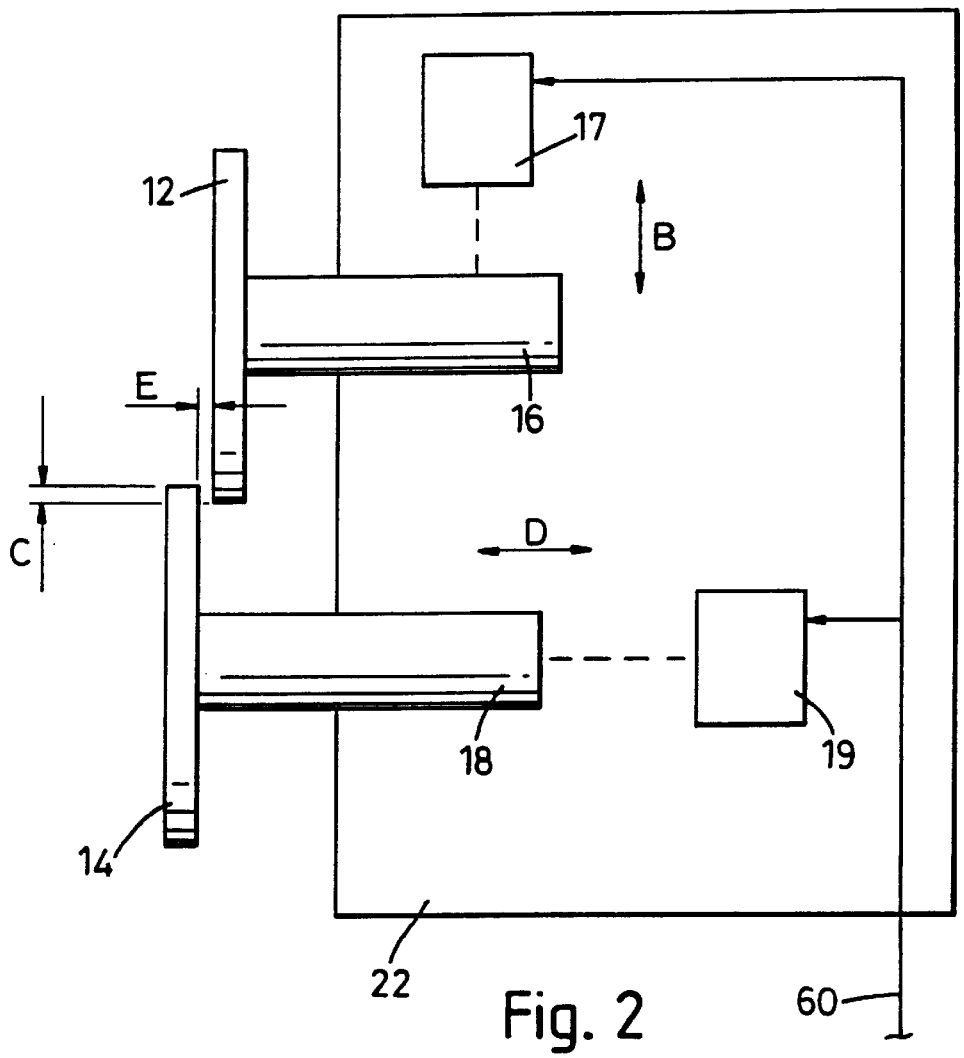
FIG. 2 is a schematic end view of a pair of rotary trimming blades.

FIG. 2 shows schematically one pair of rotary cutting blades 12 and 14. The upper blade shaft 16 is mounted in the housing 22 for vertical adjustment as indicated at B to set a desired degree of radial overlap C between the upper blade 12 and the lower blade 14. The lower blade shaft 18 is mounted in the housing 22 for horizontal movement as indicated at D to set the spacing E between the opposing faces of the upper and lower blades.

Figure 3:
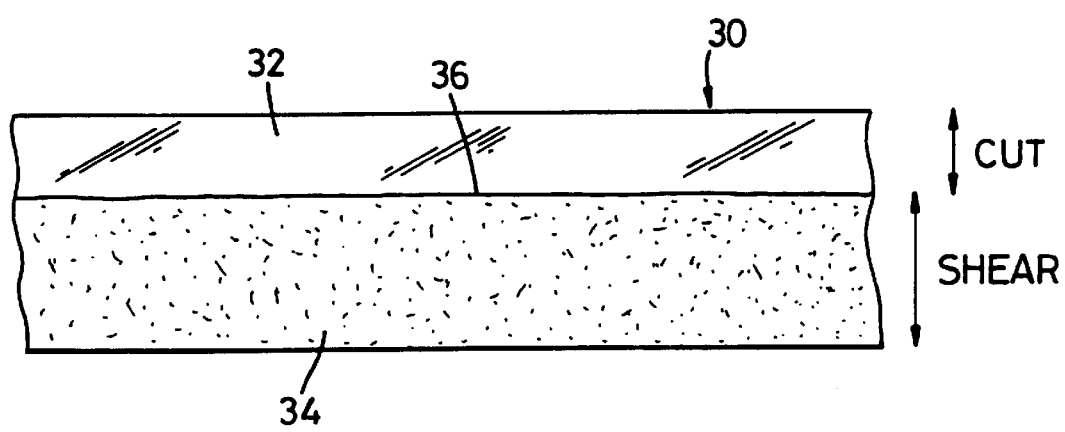
FIG. 3 illustrates a typical trimmed edge.

FIG. 3 depicts the nature of the cut edge produced by the process outlined above. The parting of the edge from the main body of the strip 10 is achieved by a combination of slitting and shearing, with the edge face 30 exhibiting an upper slit region 32 and a lower sheared region 34, these meeting in dividing line 36. The present invention is based on monitoring the ratio between the depth of the slit region 32 and the sheared region 34 (the "slit:shear ratio") and, optionally, the straightness of the dividing line 36, and controlling the edge trimming process so as to maintain the parameter(s) within predetermined limits.

The invention achieves this by use of an optical technique, which is aided by the fact that the slit region 32 has a relatively reflective or specular quality and contrasts suitably with the sheared region 34 which has a relatively matt or dispersive quality.

Figure 4:
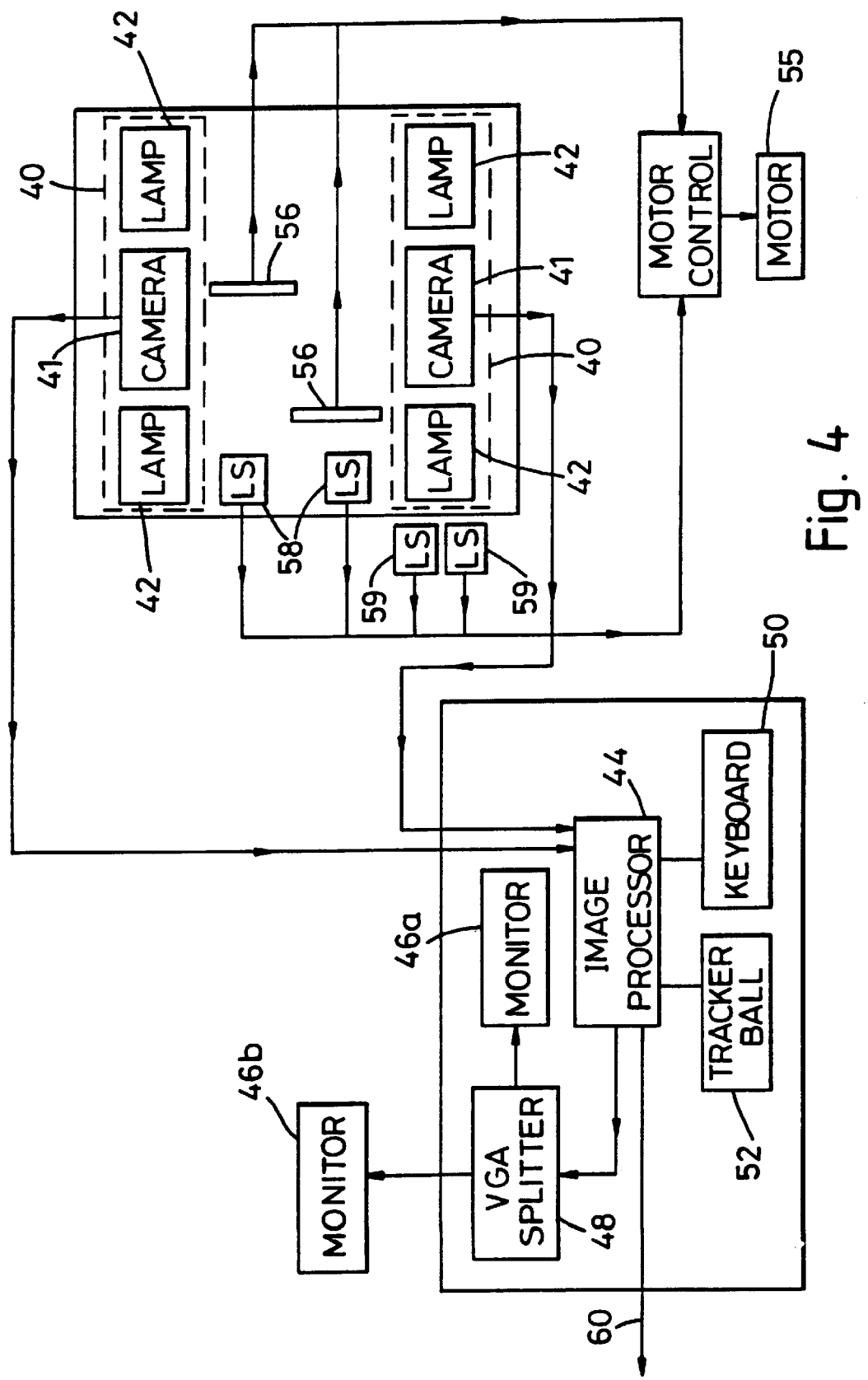
FIG. 4 is a system diagram of a system forming one example of the present invention.

Turning to FIG. 4, a system embodying the present invention comprises, at either side of the strip, a video camera head 40 arranged to view the cut edge of the strip, each camera head 40 comprising a video camera 41 and a pair of lamps 42 illuminating the cut edge of the strip 10. The video cameras 41 are suitably CCD type cameras, for example "TM-6" series CCD cameras by Pulnix. The lamps 42 may for example be "Type 880 Microlight" infrared illuminator by Dennard; the use of infrared has the advantage of minimizing interference by ambient sources. The video signals produced by the camera heads 40 are supplied to a camera image processor 44 which is typically a PC-type computer based on a 66 Mhz 80486 processor.

The image processor 44 provides output signals to drive one or more display monitors 46. In the example shown, the image processor 44 drives two monitors 46a, 46b via a VGA splitter 48, with the image processor 44, VGA splitter 48 and a first monitor 46a being positioned in an edge inspection control station, and a second monitor 46b being positioned adjacent the side trimmers themselves. The edge inspection control station also includes a keyboard 50 and trackerball 52 for operator interaction with the system.

The system can be calibrated by viewing a reference sample of known dimensions and configuring the system to these dimensions. The operator can then instruct the system where measurements are to be taken using the keyboard 50 and trackerball 52 to identify datum points on the screen image and to set acceptable tolerance parameters.

Figure 5:
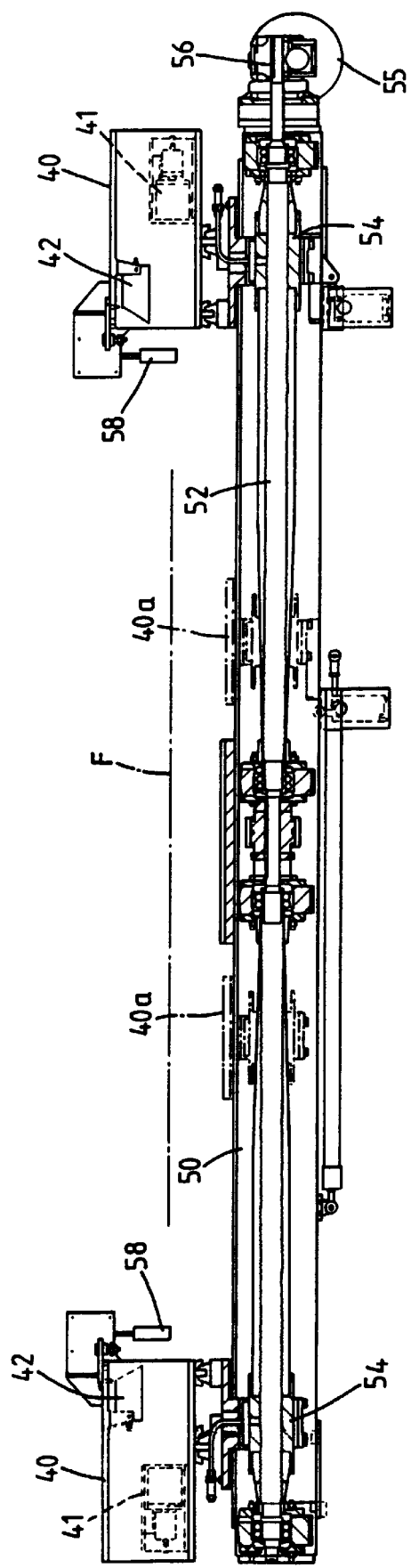
FIG. 5 is a cross-sectional end view of an apparatus used in the system of FIG. 4.

FIG. 5 illustrates one example of mechanical arrangement suitable for use in the system of FIG. 4. The strip being processed travels along the plane F. The camera heads 40 are carried by a transverse slideway 50 and can be moved in and out in unison by means of an oppositely-threaded shaft 52 engaging nuts 54 on the camera housings 40 and driven by a motor 55 via a worm drive 56 between the outermost positions shown in full and the innermost positions partially shown in phantom at 40a. As seen in FIG. 4, position transducers 56 monitor the strip edge and control the motor 55 to maintain the cameras 41 at a constant spacing from the strip edge, thus avoiding out-of-focus problems. The camera heads 40 are also provided with limit switches 58 (see also FIG. 5) which contact the edge of the strip in the event of a transducer malfunction to prevent collision. Limit switches 59 (see FIG. 4) are also provided for end-of-travel protection.

The image processor 44 is programmed to digitize the image of the strip edge and to extract from the digitised image information defining the slit:shear ratio and the straightness of the dividing line 36. This can be achieved readily because of the distinct differences in luminance of the slit region 32, the sheared region 34, and the background. Suitable software for handling this information processing will be apparent to those in the data processing art, and does not directly form part of the present invention. One suitable form of image processing software is available from Integral Vision Limited of Woburn Industrial Estate, Kempston, Bedford.

The figures for slit:shear ratio and straightness which give a satisfactory edge quality can be determined empirically for particular materials. As an example, we have determined that for normal commercial rolled steel strip a slit:shear ratio of about 30:70 gives suitable results. For some harder steels, a ratio of about 20:80 is suitable.

The allowable tolerance around these values can also be readily determined by experimental techniques, but typically up to ±10% has been found to be perfectly practicable when operating with commercial mild steel strip. In one preferred emobodiment, the slit:shear ratio is maintained in a range of ±1%.

Optionally, the straightness of the dividing line 36 may also be used as a controlling parameter. Once again, the degree of straightness which is associated with acceptable edge quality in a given material may be established empirically, but typically it will be desirable to contain the dividing line within a band constituting about 5% of the strip thickness.

In the embodiment described above, the inspection system provides an output in the form of screen displays, which are then used by the operator to determine whether adjustment of the edge trimmers is required. The display available to the operator may simply comprise the current slit:shear ratio and straightness for each edge, but preferably freeze-frame views of the actual edges will be available to the operator, and an alarm indication will be given if the parameters move out of specification.

It is equally possible for the output of the image processing to be used in a feedback loop 60 to alter the setting of the edge trimmers. To this end, the cutting blade shafts 16 and 18 may be provided with powered adjustment means as indicated at 17 and 19 in FIG. 2 which may comprise, for example, hydraulic rams or hydraulic or electric motors operating through worm drive units.

The system of the present invention allows wastage to be substantially reduced and higher quality standards to be achieved. The life of the trimming blades is substantially extended by maintaining accurate settings, with reduced maintenance costs and the time spent in blade change operations substantially cut.

Although described specifically with reference to steel strip, the invention is applicable to other strip materials which are edge trimmed in a similar manner, both metallic (such as aluminium in particular) and non-metallic.

We claim:

1. A method of inspecting an edge of strip metal after the edge has been trimmed by at least one cutting device, the method comprising the following steps:

providing an inspection station comprising at least one image producer;

passing the trimmed edge past the inspection station;

forming at least one image of the trimmed edge as it passes the inspection station; and analyzing the at least one image of the trimmed edge in real time to determine at least one quality characteristic thereof;

wherein the at least one quality characteristic comprises the slit-to-shear ratio of the trimmed edge.

2. The method of claim 1 wherein the at least one quality characteristic further comprises the straightness of the line dividing the slit and sheared zones of the trimmed edge.

3. The method of claim 1, further comprising the step of utilizing the at least one quality characteristic to adjust the at least one cutting device to control the trimming process;

wherein a computer-controlled feedback mechanism is utilized to adjust the position of the at least one cutting device.

4. The method of claim 1 wherein the at least one image comprises a series of images.

5. The method of claim 1 wherein the at least one image producer comprises a video image producer.

6. The method of claim 1 wherein the at least one image is analyzed by a computer-controlled image processor.

7. The method of claim 1 wherein the at least one cutting device comprises an upper and a lower rotary cutting blade.

8. A method of inspecting an edge of strip metal after the edge has been trimmed by at least one cutting device, the method comprising the following steps:

providing an inspection station comprising at least one image producer;

passing the trimmed edge past the inspection station;

forming at least one image of the trimmed edge as it passes the inspection station; and analyzing the at least one image of the trimmed edge in real time to determine at least one quality characteristic thereof;

said method further comprising the step of utilizing the at least one quality characteristic to adjust the at least one cutting device to control the trimming process;

wherein the at least one quality characteristic comprises the slit-to-shear ratio of the trimmed edge; and wherein the slit-to-shear ratio is maintained in a range of ±1%.

9. The method of claim 8 wherein the at least one quality characteristic further comprises the straightness of the line dividing the slit and sheared zones of the trimmed edge.

10. The method of claim 8 wherein a computer-controlled feedback mechanism is utilized to adjust the position of the at least one cutting device.

11. The method of claim 8 wherein the at least one image comprises a series of images.

12. The method of claim 8 wherein the at least one image producer comprises a video image producer.

13. The method of claim 8 wherein the at least one image is analyzed by a computer-controlled image processor.

14. The method of claim 8 wherein the at least one cutting device comprises an upper and a lower rotary cutting blade.

15. An apparatus for inspecting an edge of strip metal after the edge has been trimmed by at least one cutting device, the apparatus comprising:

an inspection station through which the trimmed edge is passed, the inspection station comprising at least one image producer operable to form at least one image of the trimmed edge; and an image processor in operational association with the at least one image producer, the image processor operable to analyze the at least one image in real time to determine at least one quality characteristic of the trimmed edge.

wherein the at least one quality characteristic comprises the slit-to-shear ratio of the trimmed edge.

16. The apparatus of claim 15, further comprising a feed-back mechanism in operational association with the image processor and the at least one cutting device, the feed-back mechanism operable to adjust the position of the at least one cutting device to control the trimming process.

17. The apparatus of claim 15 wherein the at least one quality characteristic further comprises the straightness of the line dividing the slit and sheared zones of the trimmed edge.

18. The apparatus of claim 15 wherein the at least one image comprises a series of images.

19. The apparatus of claim 15 wherein the at least one image producer comprises a video image producer.

20. The apparatus of claim 15 wherein the at least one cutting device comprises an upper and a lower rotary cutting blade.

21. The apparatus of claim 15, further comprising a display mechanism in operational association with the at least one image producer, the display mechanism operable to display the at least one image of the trimmed edge.

22. The apparatus of claim 15, further comprising a display mechanism in operational association with the at least one image producer and the image processor, the display mechanism operable to display the at least one image and information relating to the at least one quality characteristic of the trimmed edge.

23. The apparatus of claim 15 wherein the image processor comprises a computer-controlled image processor.

* * * * *